(12) United States Patent
Struthers

(10) Patent No.: US 7,159,257 B1
(45) Date of Patent: Jan. 9, 2007

(54) DISPOSABLE PROTECTIVE SHEET FOR FURNITURE

(76) Inventor: Lilyn M Struthers, # 311-1964 Enterprise Way, Kelowna, British Columbia (CA) V1Y 9S7

( * ) Notice: Subject to any disclaimer, the term of this patent is extended or adjusted under 35 U.S.C. 154(b) by 0 days.

(21) Appl. No.: 11/102,774

(22) Filed: Apr. 8, 2005

(51) Int. Cl.
*A47G 9/00* (2006.01)

(52) U.S. Cl. .................. 5/487; 5/484; 5/925; 119/28.5

(58) Field of Classification Search .............. 5/484, 5/487, 925; 119/28.5; 442/340, 346, 394, 442/398, 399; 428/903
See application file for complete search history.

(56) References Cited

U.S. PATENT DOCUMENTS

| | | | |
|---|---|---|---|
| 3,315,676 A * | 4/1967 | Cooper | 604/366 |
| 3,576,039 A * | 4/1971 | Roberts | 5/484 |
| 4,536,433 A * | 8/1985 | Sagi et al. | 428/195.1 |
| 4,676,376 A | 6/1987 | Keiswetter | |
| 4,840,841 A * | 6/1989 | Madsen | 428/136 |
| 5,233,787 A * | 8/1993 | Andersen | 43/132.1 |
| 5,294,166 A | 3/1994 | Shapland | |
| 5,351,646 A | 10/1994 | Zoroufy | |
| 5,515,811 A * | 5/1996 | McAlister | 119/28.5 |
| 5,537,952 A * | 7/1996 | Devlin | 119/28.5 |
| 5,685,257 A * | 11/1997 | Feibus | 119/28.5 |
| 5,724,911 A | 3/1998 | McAlister | |
| 6,095,091 A | 8/2000 | Byrne | |
| 6,550,092 B1 | 4/2003 | Brown et al. | |
| 2003/0041808 A1 * | 3/2003 | Wulforst et al. | 119/28.5 |

FOREIGN PATENT DOCUMENTS

| | | |
|---|---|---|
| CA | 2.319.885 | 3/2001 |
| EP | 0.671.258 | 9/1995 |
| EP | 0.945.251 | 9/1999 |

* cited by examiner

*Primary Examiner*—Michael Trettel
(74) *Attorney, Agent, or Firm*—Michael I Kroll

(57) ABSTRACT

A disposable pet hair-collector pad comprising a planar pliable sheet having a layer incorporating a formulation to attract and capture pet hair, dander, saliva, etc., and a backing layer of a fluid impermeable material.

12 Claims, 9 Drawing Sheets

DISPOSABLE PROTECTIVE SHEET FOR FURNITURE

BACKGROUND OF THE INVENTION

1. Field of the Invention

The present invention relates generally to protective pads and, more specifically, to a disposable pet hair-collector pad comprising a planar pliable sheet having a layer incorporating a formulation to attract and capture pet hair, dander, saliva, etc., and a backing layer of a fluid impermeable material.

Additionally, pieces of spaced apart frictional material are appropriately positioned to prevent casual displacement of the sheet after selective placement. The frictional material can also occur as strips on opposing sides. The collector pads are selectively disposable. A perforation can extend between opposing points providing a smaller disposable collector pad when desired. Decorative elements such as color and image can be incorporated for aesthetics.

2. Description of the Prior Art

There are other pads designed for pets. Typical of these is U.S. Pat. No. 4,676,376 issued to Keiswetter on Jun. 30, 1987.

Another patent was issued to Shapland on Mar. 15, 1994 as U.S. Pat. No. 5,294,166. Yet another U.S. Pat. No. 5,351,646 was issued to Zoroufy on Oct. 4, 1994 and still yet another was issued on May 14, 1996 to McAlister as U.S. Pat. No. 5,515,811.

Another patent was issued to Devlin on Jul. 23, 1996 as U.S. Pat. No. 5,537,952. Yet another U.S. Pat. No. 5,685,257 was issued to Feibus on Nov. 11, 1997. Another was issued to McAlister on Mar. 10, 1998 as U.S. Pat. No. 5,724,911 and still yet another was issued on Aug. 1, 2000 to Byrne as U.S. Pat. No. 6,095,091.

Another patent was issued to Brown et al. on Apr. 22, 2003 as U.S. Pat. No. 6,550,092. Yet another European Patent Application No. EP0945251 was published on Sep. 29, 1999 to Tanaka. Another was filed by Kramer on Sep. 13, 1995 as European Patent Application No. EP0671258 and still yet another was issued on Mar. 16, 2001 to Ross et al. as U.S. Pat. No. CA2319885.

U.S. Pat. No. 4,676,376

Inventor: Paul C. Keiswetter

Issued: Jun. 30, 1987

A temporary protective cover for an automobile seat or the like which comprises an elongated strip of film with a pocket or cap at the upper end that fits over the upper end of the set, with the remaining portion of the film extending downwardly over the front surface of the seat. The film is a co-extruded film formed of two different thermoplastic materials having different cling properties, such that a sticky side of the film faces inwardly against the seat and a slippery side faces outwardly. High density polyethylene forms one surface and low density or linear low density polyethylene forms the other surface. A seat cover thus formed clings to the seat and prevents dislodging of the seat cover even though the seat cover may be subjected to a sideways displacement force when a person or other object slides across the exterior surface of the seat cover. The seat covers are folded and stored individually in a convenient dispense box prior to use, with each cover being folded so that the inward sticky side contacts itself, leaving the exterior slippery side exposed for easy removal of the covers from the box. Also, when the sticky sides are separated, a static charge is generated that enhances the cling properties of the sticky side of the cover.

U.S. Pat. No. 5,294,166

Inventor: Robert K. Shapland

Issued: Mar. 15, 1994

A protective liner (10) for a vehicle interior that comprises seat and floorboard portions (12, 14) that are preferably releasably connected by hook and loop fastening means (34A, 34B). The floorboard portion (14) of the subject liner (10) preferably further comprises laterally extending wing sections (26) adapted to provide protective coverage adjacent to the door threshold and the transmission or driveline tunnel of a vehicle.

U.S. Pat. No. 5,351,646

Inventor: Aboolhassan Zoroufy

Issued: Oct. 4, 1994

A portable hair collecting furniture device for cats includes an open ended rigid housing having a C-shaped partially cylindrical top portion and a planar floor portion. A first material with a plurality of raised rubberized protuberances on its exterior surface is located upon the interior of the device with the protuberances oriented toward the interior of the device. A compressible second material having a plurality of compressible parallel ribs overlies the floor. A flexible carrier is used in conjunction with the device includes a carrier top portion joined to a carrier floor portion with two housing ends opposite one another and joined to the floor portion. One of the ends is releasably closed with a zipper and has a perforate panel. A pair of handles affixed to the top portion. A safety strap is centrally positioned on the exterior surface of the top portion of the carrier. A kit utilizing the cat carrier and the cat furniture device is also provided.

U.S. Pat. No. 5,515,811

Inventor: John B. McAlister

Issued: May 14, 1996

The present invention is a cushion for a pet, preferably a cat, comprising a pad of a plurality of layers of raw unwoven, uncovered polyester. Each layer comprises a solid first fiber and a second fiber that has a core and a sheath surrounding the core. The sheath has a lower melting temperature than the core. The pad is then heated to the temperature, where the sheath of the second fiber melts and sticks to the adjacent fiber, whether a first or a second fiber, and then cooled until the second fiber solidifies, attached to the adjacent fiber. The resulting material is a matted web of layered, electrostatic fibers that is subsequently cut into a pad of suitable size, such as large enough to accommodate a sleeping cat. The edge of the pad is bound by sewing or heat treatment.

U.S. Pat. No. 5,537,952

Inventor: Joseph T. Devlin

Issued: Jul. 23, 1996

An improved pet sheet bed cover is provided for a bed having bedding on a mattress sitting on a box spring, which consists of a component for protecting the bedding from being soiled by a pet, such as from hairs, urine, feces, vomit and other animal debris. The protecting component is a bed covering fabricated out of waterproof and soil proof flexible material.

U.S. Pat. No. 5,685,257

Inventor: Mariam Feibus

Issued: Nov. 11, 1997

A cushion for supporting humans and animals, particularly domestic pets, includes a plurality of layers including a layer of absorbent and anti-static material providing a cover, a first intermediate layer formed from an absorbent material, a second intermediate layer formed from polyester fill material, and a fluid impermeable inner layer having a plurality of cushioning elements formed therein. The pet bed of the present invention is stain-resistant, washable, hypoallergenic and non-toxic.

U.S. Pat. No. 5,714,911

Inventor: John B. McAlister

Issued: Mar. 10, 1996

A cushion for a pet, preferably a cat, comprising a bed formed from a sheet comprising a plurality of layers of raw unwoven, uncovered polyester. Each layer comprises a solid first fiber and a second fiber that has a core and a sheath surrounding the core. The sheath has a lower melting temperature than the core. The sheet is then heated to the temperature, where the sheath of the second fiber melts and sticks to the adjacent fiber, whether a first or a second fiber, and is then cooled until the second fiber solidifies, attached to the adjacent fiber. The resulting material is a matted web of layered, electrostatic fibers that is subsequently cut into a right cylinder having a closed end of suitable size, such as large enough to accommodate a sleeping cat. The cylinder wall is then folded down on itself from its open end to form an annular upright wall having an inside layer and an outside layer, where the outside layer compresses the inside layer to form a more rigid wall.

U.S. Pat. No. 6,095,091

Inventor: Charles Byrne

Issued: Aug. 1, 2000

A pet training mat for deterring pets and training them to avoid an area deemed desirable to keep pet-free by the pet owner. The pet training mat includes a base having a lower surface and an opposite upper surface, and a plurality of tines which extend upwardly from the upper surface of the base. The tines create an uncomfortable environment for a pet when walking, standing or laying on the pet training mat, without harming the pet, and are distributed over substantially the entire upper surface of the base within the range of four to nine tines per square inch. Each tine includes an upper spike and a riser disposed between the spike and the upper surface of the base. The base may be rigid or formed of a flexible material to conform to the contours of the pet-free area.

U.S. Pat. No. 6,550,092

Inventor: Colin W. Brown

Issued: Apr. 22, 2003

A cleaning sheet is provided. The cleaning sheet includes a fabric layer with a plurality of cavities in at least one major surface. In one embodiment, fabric layer surface secured to a flexible backing layer so as to define an outer fabric surface with a plurality of cavities therein. The cavities can include a tacky bottom surface capable of enhancing the retention of dust and other particles. Cleaning implements and methods of cleaning surfaces using the cleaning sheet are also described.

U.S. Patent Number EP0671258

Inventor: John Robert Kramer

Issued: Feb. 22, 1995

A laminate comprises: (a) a substrate consisting of glass, polycarbonate, or polymethylmethacrylate; (b) a film selected from polycarbonate and polymethylmethacrylate; and (c) an adhesive for replaceably adhering (b) to (a). The laminate can be repaired by replacing (b). (1) a laminate consisting of a substrate, which is a core laminate, and a film (see CLAIMED LAMINATE); (2) a laminate consisting of a plastic glazing substrate; an optical film; and an adhesive; (3) a method for assembling a laminate; and (4) a method for repairing the laminate (see CLAIMED METHOD).

European Patent Application Number EP0945251

Inventor: Yoshinori Tanaka

Issued: Sep. 29, 1999

A multi-ply cleaning sheet (S) which comprises a first layer (1) with a plurality of holes (3) passing through it and a second layer (2), the first and second layers being placed on top of the other and bonded together so that the holes are open at one surface of the first layer and closed by the second layer at the other surface of the first layer. Owing to the first layer with holes, the cleaning sheet removes dirt effectively but does not permit dirt to penetrate to the reverse side because the holes are blocked by the second layer.

Canadian Patent Number CA2319885

Inventor: Susan E. Ross

Issued: Mar. 16, 2001

A garment for pets, designed for minimizing the distribution of hair from the pet while maximizing comfort for the pet. The garment is lightweight and, in particular, allows air to flow through unimpeded. The garment has a body panel and fasteners for fastening said body panel onto the back, sides and breast of a pet, and, in particular, the body panel is a mesh fabric.

While these pads may be suitable for the purposes for which they were designed, they would not be as suitable for the purposes of the present invention, as hereinafter described.

SUMMARY OF THE PRESENT INVENTION

A primary object of the present invention is to provide a disposable furniture pad for pets.

Another object of the present invention is to provide a disposable furniture pet pad having a collector layer and a fluid impermeable layer.

Yet another object of the present invention is to provide a disposable furniture pet pad having anti-slip elements fixed to the underside.

Still yet another object of the present invention is to provide a disposable pet pad with a pet engaging layer incorporating a formulation to retain pet hair until pad is selectively disposed.

Another object of the present invention is to provide a disposable pet pad having a perforation extending across the pad from opposing points.

Yet another object of the present invention is to provide a disposable pet pad incorporating color, design, image or any compilation thereof.

Still yet another object of the present invention is to provide a disposable pet pad that will curtail the amount of labor spent on removing pet hair from chairs, furniture, bed linen, etc.

Additional objects of the present invention will appear as the description proceeds.

The present invention overcomes the shortcomings of the prior art by providing a disposable pet hair-collector pad comprising a planar pliable sheet having a layer incorporating a formulation to attract and capture pet hair, dander, saliva, etc., and a backing layer of a fluid impermeable material with either strips or pieces of spaced apart frictional material appropriately placed to prevent casual displacement of the sheet after selective placement. The collector pads are selectively disposable. A perforation can extend between opposing points providing a smaller collector pad when desired. Decorative elements such as color and image can be incorporated for aesthetics.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
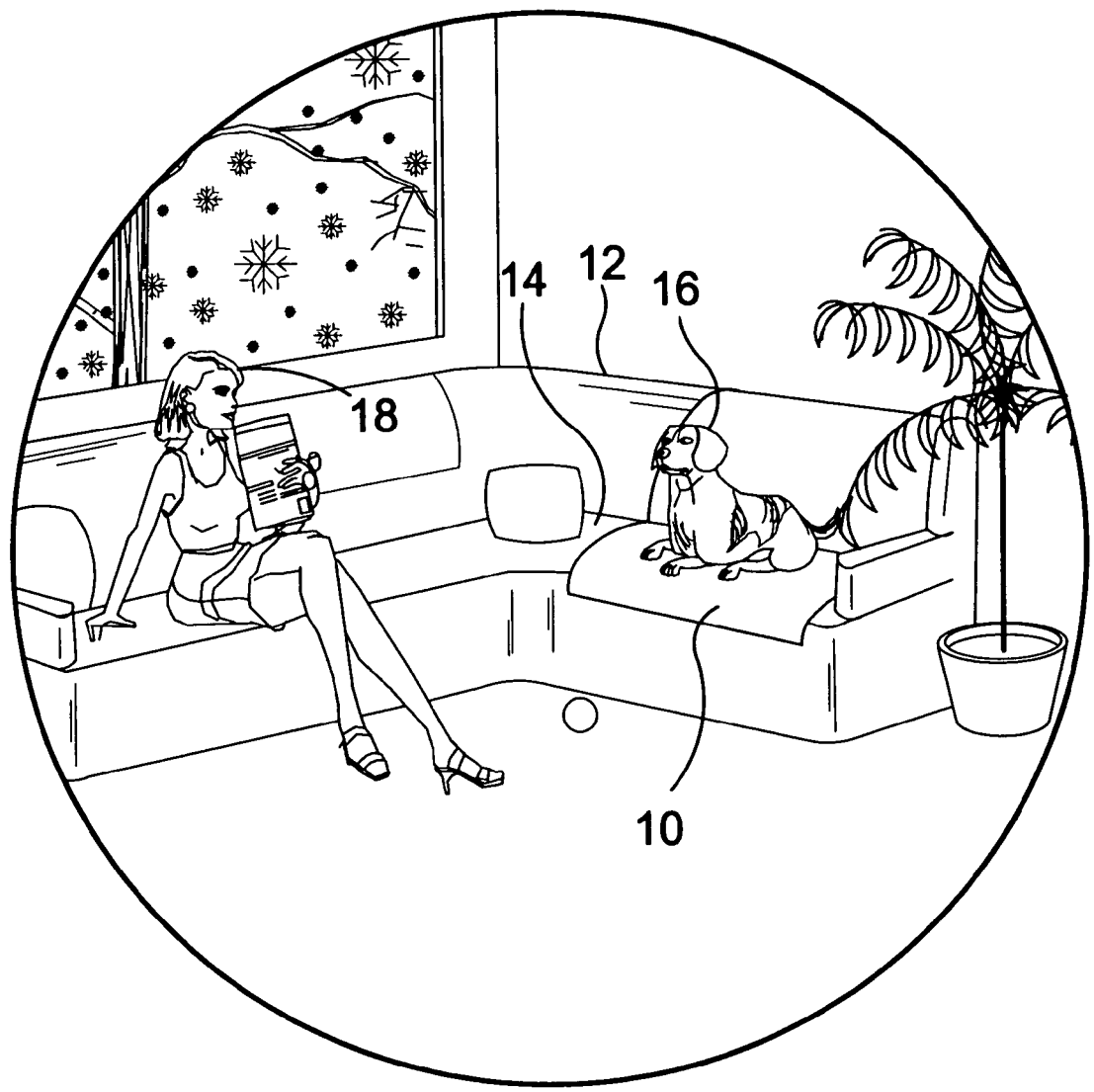
FIG. 1 is an illustrative view of the present invention in use.

Turning now descriptively to the drawings, in which similar reference characters denote similar elements throughout the several views, the figures illustrate the disposable pet pad of the present invention. With regard to the reference numerals used, the following numbering is used throughout the various drawing figures.

10 disposable pet pad of the present invention
11 disposable sheet
12 furniture
14 surface of 12
16 pet
18 user
20 pet hair retentive top layer of 10
22 perforation strip
24 multiple fluid and odor absorbing layers
26 top side of 10
28 underside of 10
30 trash bag
32 trash can
34 fluid barrier
36 absorbent layer
38 electrostatic microfibers
40 elastomeric grip strip
42 odor control elements

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. Shown is the disposable sheet 11 of the present invention 10 placed on a surface 14 of a piece of furniture 12 as selected by the user 18. The present invention 10 is designed to be appealing to pets 16 and to prevent fur, fluids and odors from being transferred from the pet 16 to the furniture 12.

Figure 2:
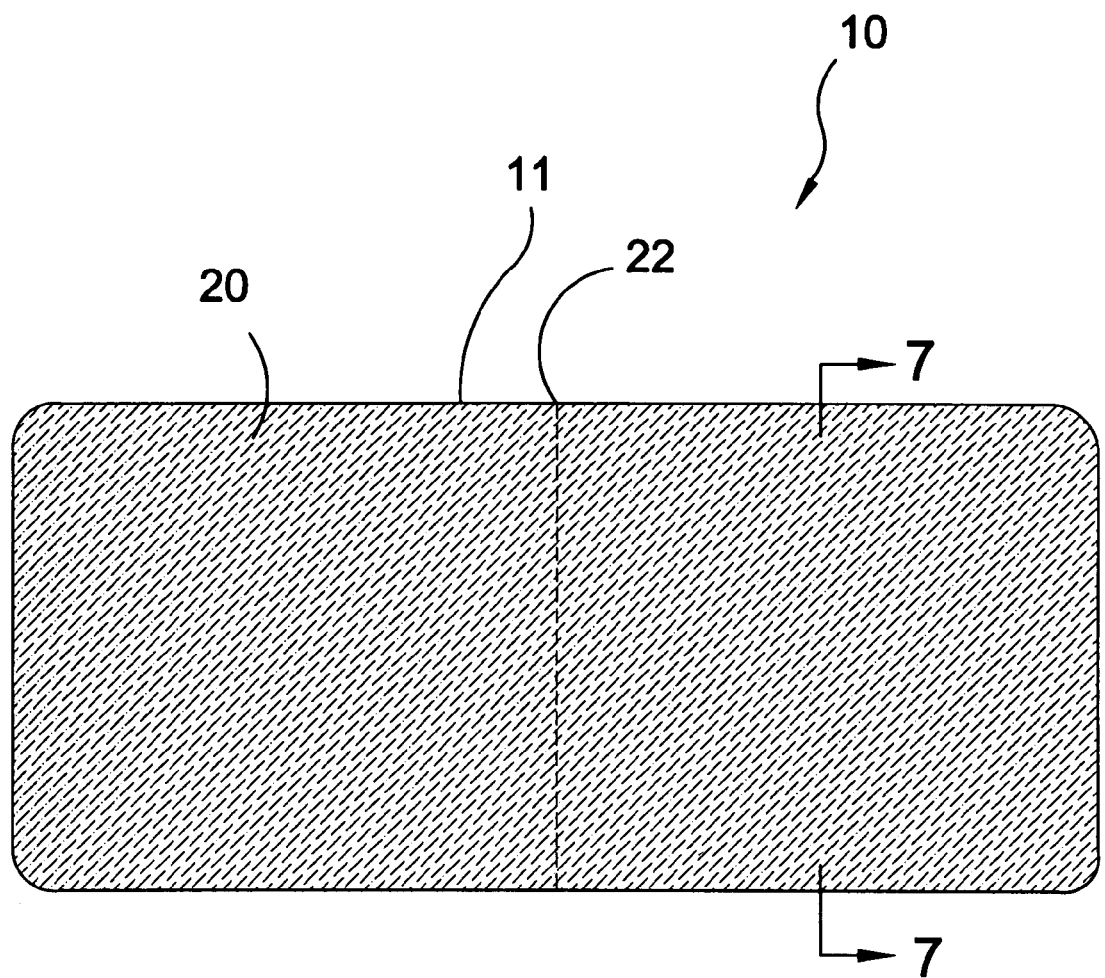
FIG. 2 is an orthographic view of the present invention.

FIG. 2 is an orthographic top view of the present invention 10. Shown is the top side 26 of the disposable protective sheet 11 for furniture comprising a pet hair retentive top layer 20. Said sheet having at least one perforated strip 22 whereby the sheet 11 can be dimensionally altered to a smaller size. In addition, one or more chemical compositions can be infused or applied to the sheet 11 serving as odor absorbers or scent emitting. The present invention 10 can be provided in different quantities and sizes.

Figure 3:
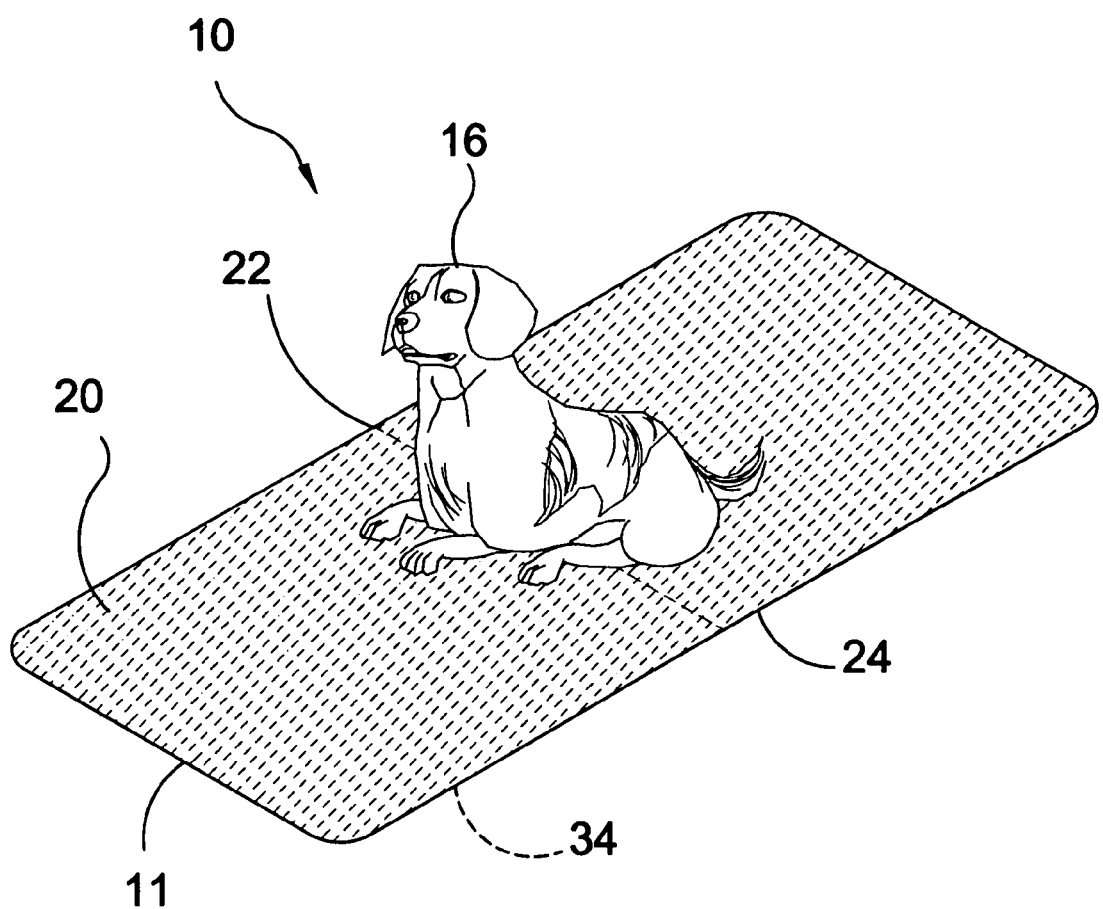
FIG. 3 is a perspective view of the present invention in use.

FIG. 3 is a perspective view of the present invention 10 in use. Shown is a perspective view of the present invention 10 in use, the disposable protective sheet 11 for furniture comprising a pet hair retentive top layer 20 with a fluid impermeable bottom layer 34 having elastomeric elements to impede movement after selective placement. One or more chemical compositions can be infused or applied to the sheet 11 serving as odor absorbers or scent emitting. The present invention 10 can be provided in different quantities and sizes and may be folded or cut to meet the size of the pet 16.

Figure 4:
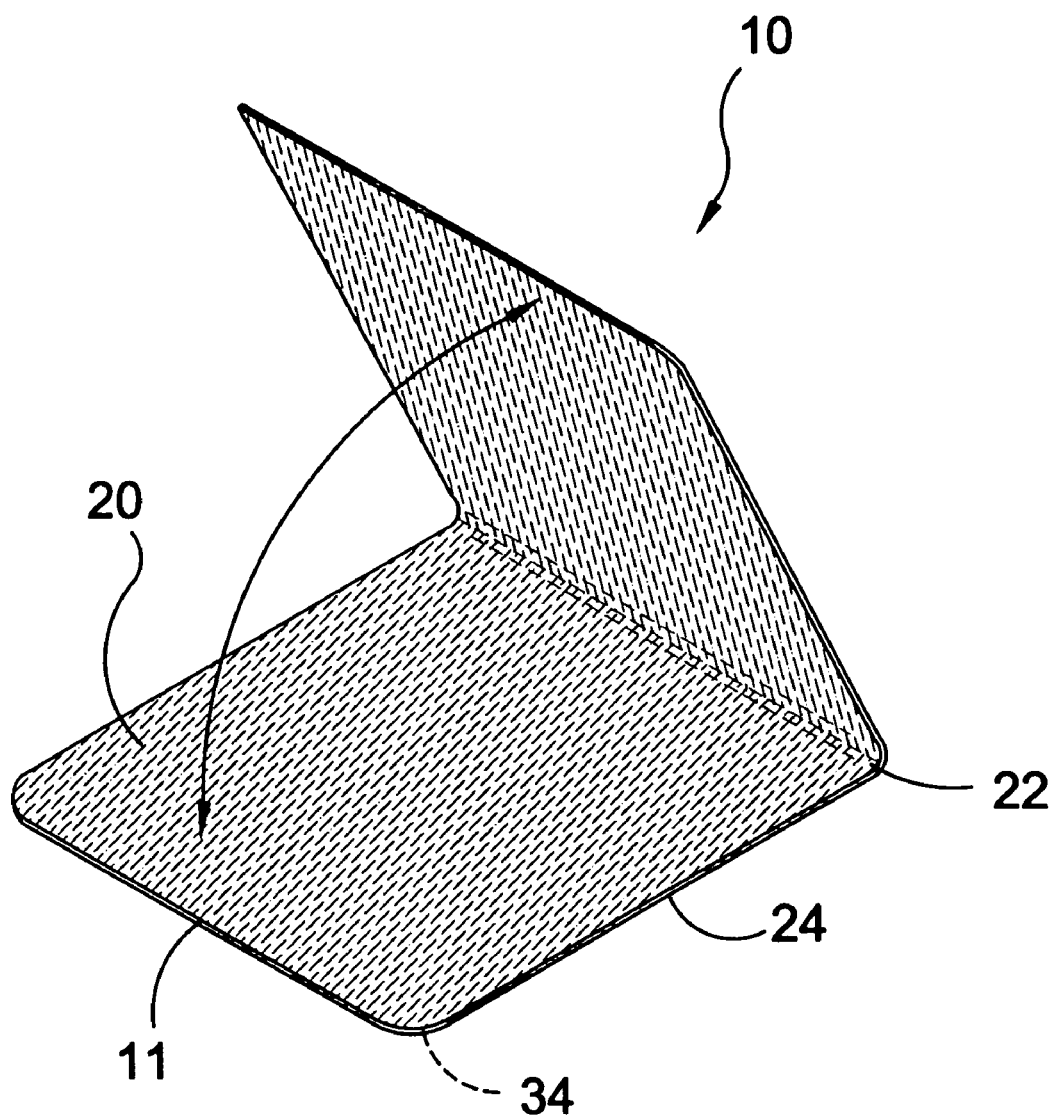
FIG. 4 is a perspective view of the present invention in a folding position.

FIG. 4 is a perspective view of the present invention 10 in a folding position. Shown is a perspective view of the present invention 10, a disposable protective sheet 11 for furniture comprising a pet hair retentive top layer 20 with a fluid impermeable bottom layer 34 having elastomeric elements to impede movement after selective placement. Said sheet 11 having at least one tear strip 22 whereby the sheet 11 can be dimensionally altered to a small size. In addition, one or more chemical compositions can be infused or applied to the sheet 11 serving as odor absorbers or scent emitting.

Figure 5:
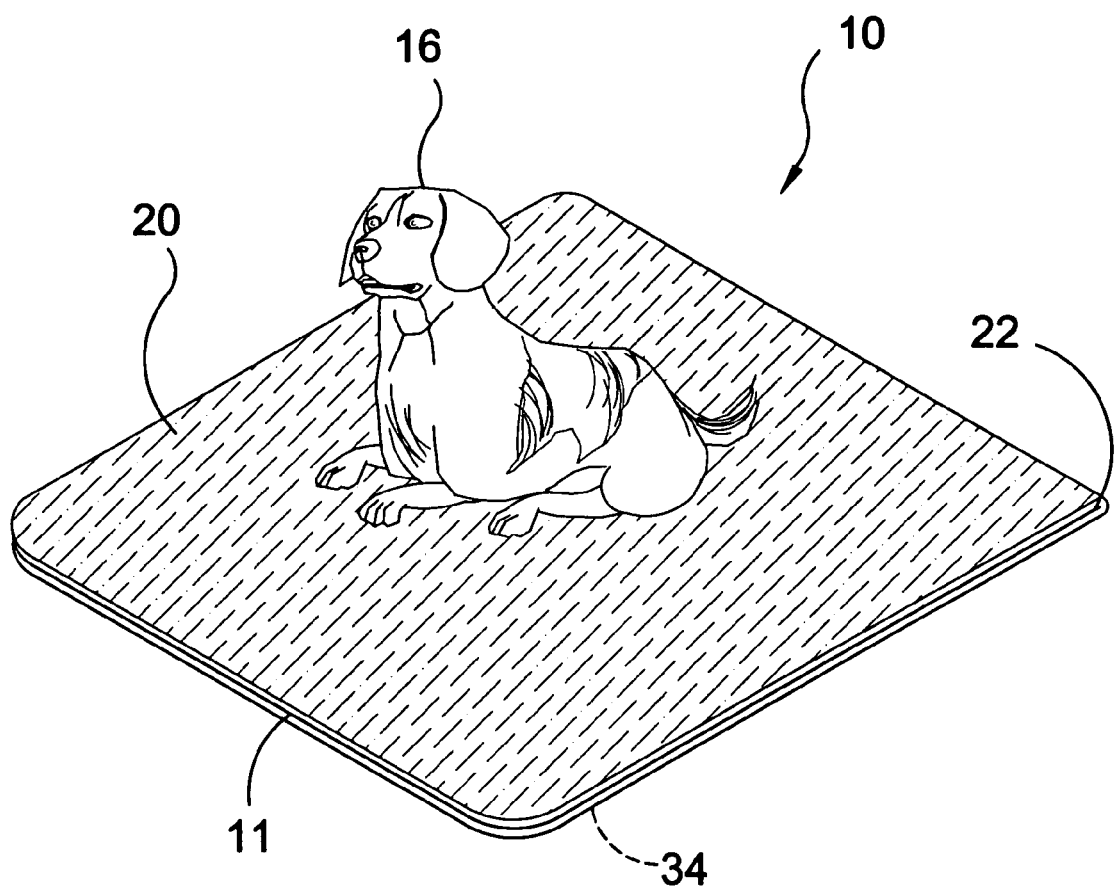
FIG. 5 is a perspective view of the present invention in a folded position.

FIG. 5 is a perspective view of the present invention 10 in a folded position with a pet 16 sitting thereon. Shown is a perspective view of the present invention 10, a disposable protective sheet 11 for furniture comprising a pet hair retentive top layer 20 with a fluid impermeable bottom layer 34 having elastomeric or polymeric elements to impede movement after selective placement. Said sheet 11 having at least one tear strip 22 whereby the sheet 11 can be dimensionally altered to a smaller size. In addition, one or more chemical compositions can be infused or applied to the sheet serving as odor absorbers or scent emitting.

Figure 6:
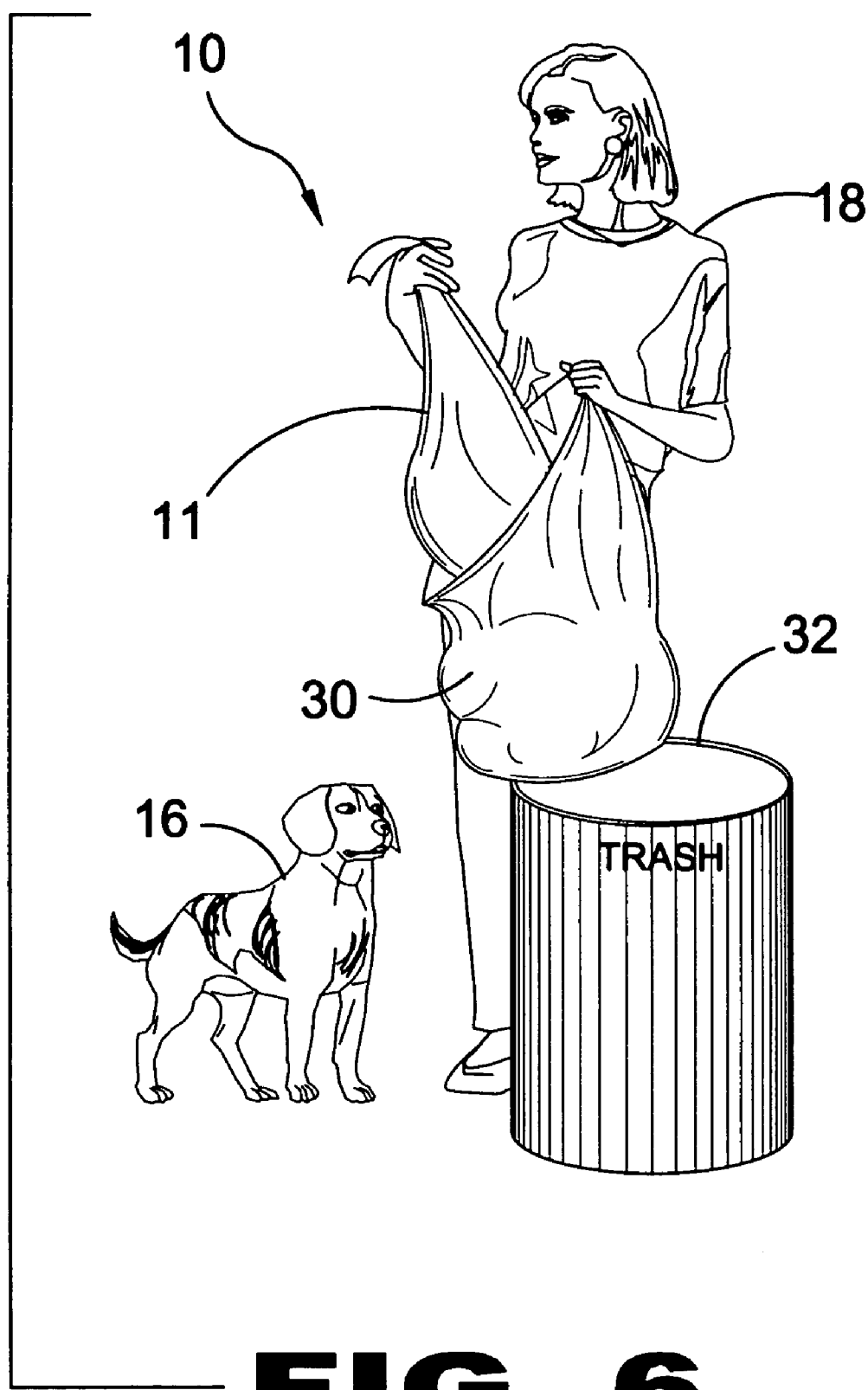
FIG. 6 is an illustrative view of the present invention being discarded.

FIG. 6 is an illustrative view of the present invention 10 being discarded into a trash bag 30 and then into a trash can 32 by the user 18. Shown is an illustrative view of the present invention 10, a disposable protective sheet 11 for to protect furniture hair, odors and fluids due to pets 16 residing thereon.

Figure 7:
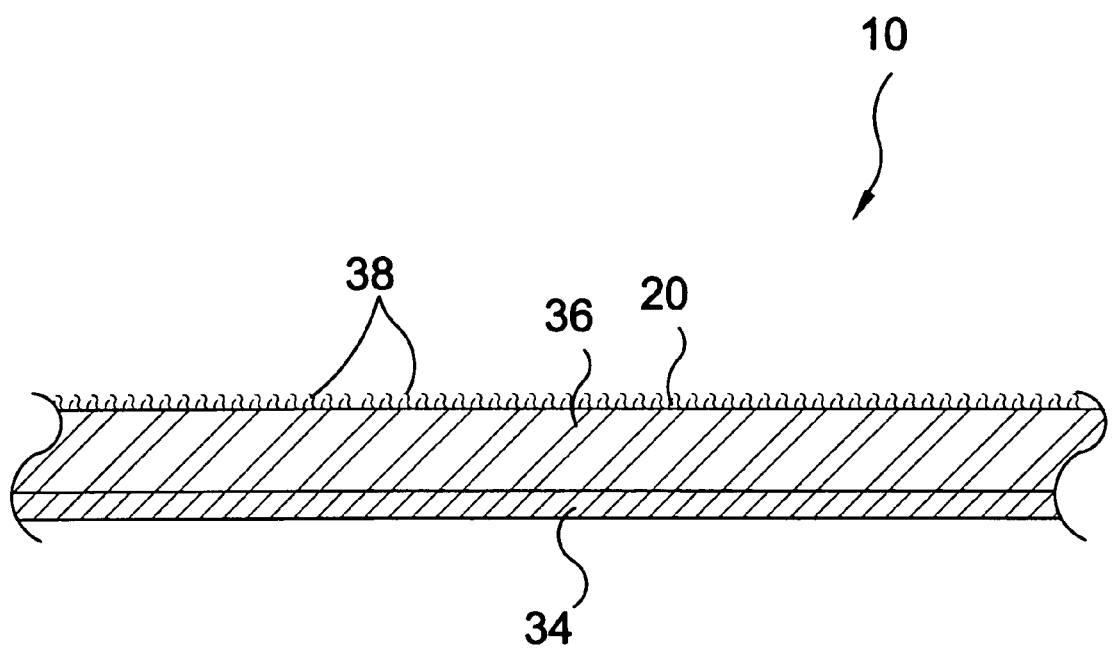
FIG. 7 is a sectional view of the present invention.

FIG. 7 is a sectional view of the present invention 10. Shown is a sectional view of the present invention 10, a disposable protective sheet for furniture comprising a pet hair retentive top layer 20 having a surface of electrostatic microfibers 38 to provide comfort to the pet and retain their fur. A fluid impermeable bottom layer 34 is provided to prevent any excretions from the pet from passing therethrough. An absorbent middle layer 36 further serves to protect the furniture.

Figure 8:
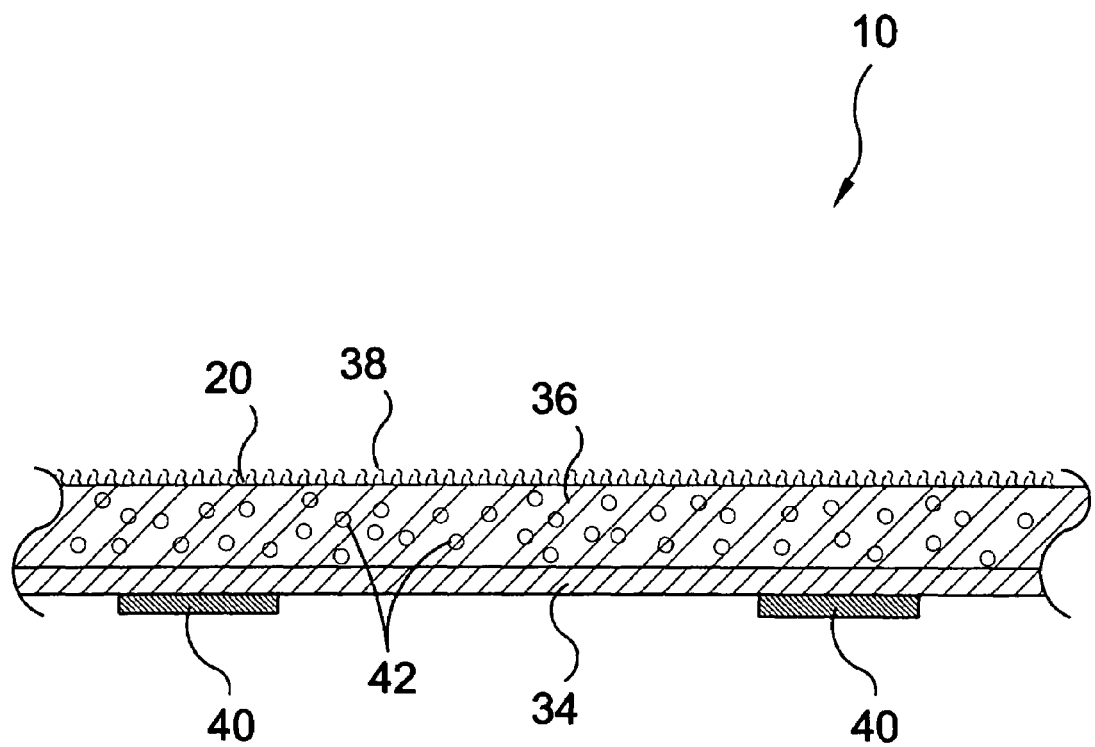
FIG. 8 is a sectional view of the present invention.

FIG. 8 is a sectional view of the present invention 10. Shown is a sectional view of the present invention 10, a disposable protective sheet for furniture comprising a pet hair retentive top layer 20 with electrostatic microfibers 38 with a fluid impermeable bottom layer 34 having elastomeric or polymeric elements 40 to impede movement after selective placement. Said sheet having at least one tear strip whereby the sheet can be dimensionally altered to a small size. In addition, one or more chemical compositions can be infused or applied to the sheet serving as odor absorbers or scent emitting to provide odor control elements 42.

Figure 9:
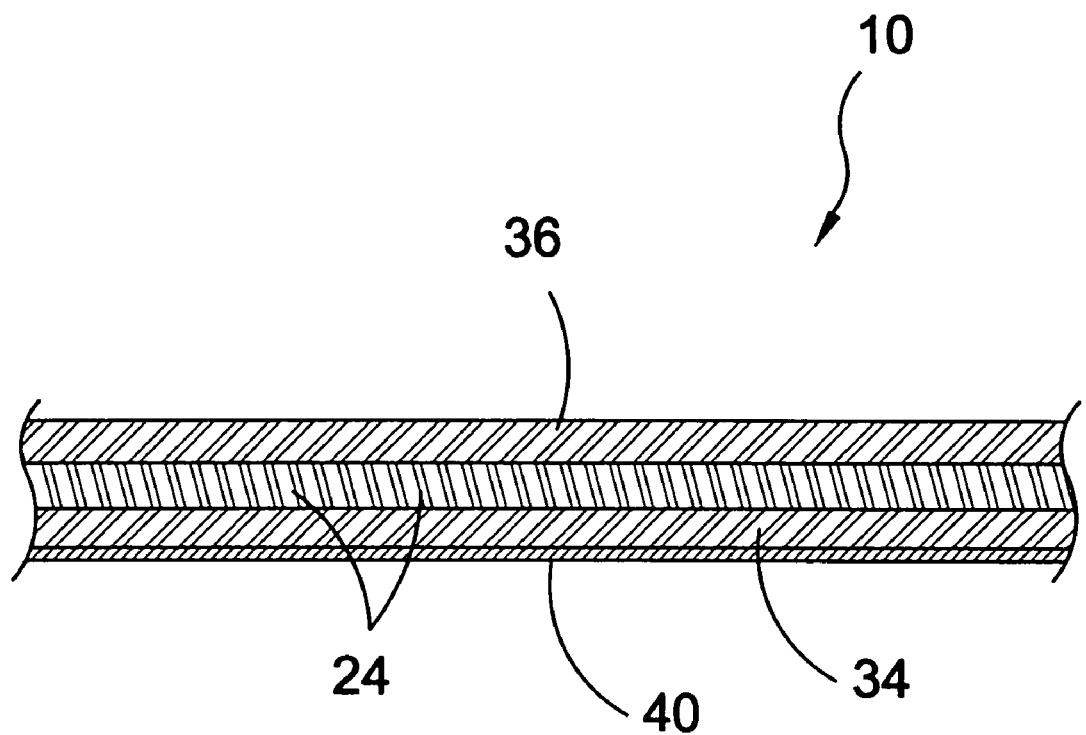
FIG. 9 is a sectional view of an alternate of the present invention.

FIG. 9 is a sectional view of an alternate of the present invention 10. Shown is a sectional view of an alternate of the present invention 10, a disposable protective sheet for furniture comprising a pet hair retentive top layer 36 with a fluid impermeable bottom layer 34 having elastomeric or polymeric elements 40 to impede movement after selective placement. Said sheet having multiple fluid and odor absorbent layers 24. In addition, one or more chemical compositions can be infused or applied to the sheet serving as odor absorbers or scent emitting.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A disposable flexible pet sheet for furniture comprising:
   a) a top side having means for retaining pet fur;
   b) an underside forming a layer with impermeable properties to prevent fluid from passing therethrough;
   c) a central layer having fluid absorption capabilities; and
   d) non-slip means disposed on said underside of said flexible sheet to retain said sheet to the furniture surface on which it is placed, wherein said pet fur retaining means is a plurality of electrostatic microfibers that serve to attract and retain loose pet fur.

2. A disposable flexible pet sheet for furniture as recited in claim 1, further including at least one perforated strip to allow the user to size said sheet accordingly to accommodate the size of the pet.

3. A disposable flexible pet sheet for furniture as recited in claim 1, wherein said non-slip means is taken from the list of elastomeric and polymeric.

4. A disposable flexible pet sheet for furniture as recited in claim 1, wherein said non-slip means is an elastomeric strip disposed along the peripheral border of said sheet.

5. A disposable flexible pet sheet for furniture as recited in claim 1, wherein said non slip means is an elastomeric surface on said underside of said flexible sheet.

6. A disposable flexible pet sheet for furniture as recited in claim 1, wherein said non slip means is a polymeric surface on said underside of said flexible sheet.

7. A disposable flexible pet sheet for furniture as recited in claim 1, wherein said central layer is infused with deodorizing agents to absorb scents that may be picked up from said pet.

8. A disposable flexible pet sheet for furniture as recited in claim 1, wherein said central layer is infused with scent emitting agents to provide a pleasant odor emanating therefrom.

9. A disposable flexible pet sheet for furniture as recited in claim 2, wherein said flexible sheet has a plurality of perforations to provide the user with a variety of sizing options for said sheet.

10. A disposable flexible pet sheet for furniture as recited in claim 1, wherein said non-slip means is a frictional material.

11. A disposable flexible pet sheet for furniture as recited in claim 1, wherein said non-slip means is an adhesive strip with a peel off backing extending along the periphery of said flexible sheet.

12. A disposable flexible pet sheet for furniture as recited in claim 1, wherein said furniture includes sofas, chairs and beds.

* * * * *